Feb. 12, 1935. M. L. WATSON ET AL 1,990,805
CONVEYER
Filed Aug. 9, 1930
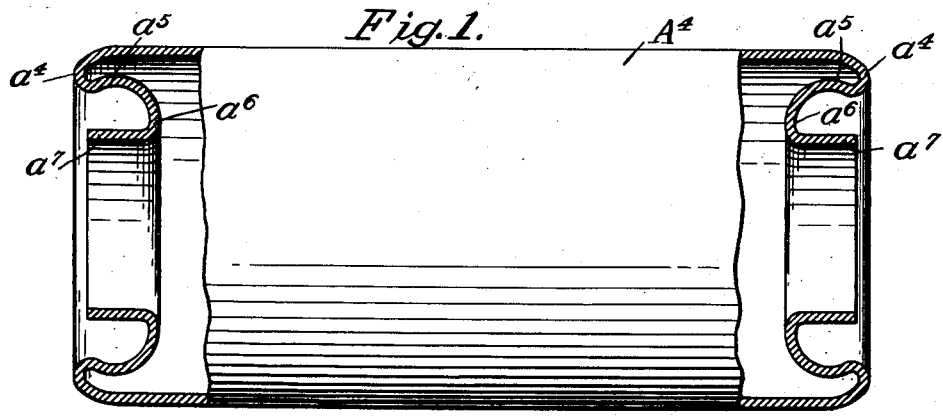
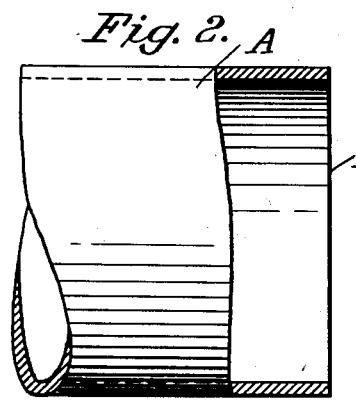
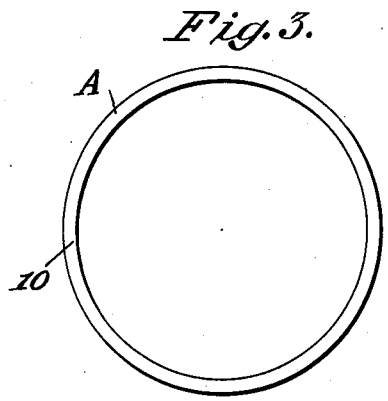
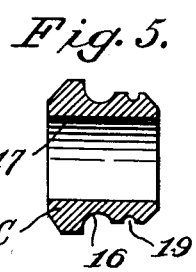
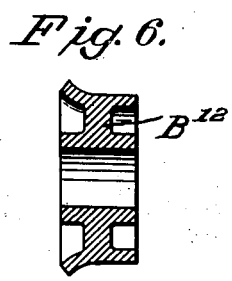
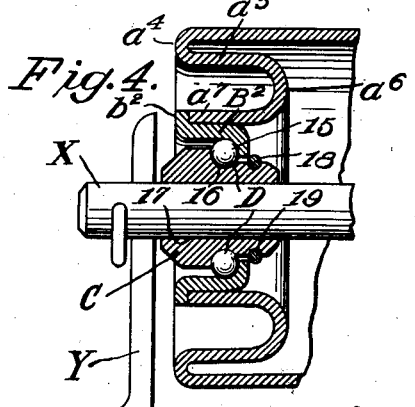
Inventors
M. L. Watson
J. C. Walter
By C. J. Stockman
Attorney Patented Feb. 12, 1935

1,990,805

UNITED STATES PATENT OFFICE 1,990,805

CONVEYER

Mervin L. Watson, Chicago, Ill., and John C. Walter, Cincinnati, Ohio, assignors to The Alvey-Ferguson Company, Cincinnati, Ohio, a corporation of Ohio Application August 9, 1930, Serial No. 474,222

3 Claims. (Cl. 193—37)

This invention comprehends a conveyer roller whose body portion and heads are formed of a single cylindrical member, as from a tube of sheet metal of appropriate length and gauge whose opposite ends are respectively shaped to form the heads and which heads are characterized in that each includes substantially concentric inner and outer rings whereof the inner ring forms a bearing seat and the outer ring is spaced from the body portion and from the inner ring and is connected with said body portion and inner ring respectively by reversely arranged curves, the said inner rings being arranged to be directly engaged by and to tightly embrace the outer surfaces of appropriately formed members which are interposed between said seats and the shafts upon which the rollers are mounted. The invention further comprehends a conveyer roller comprising the said body portion and heads, and in which the referred to appropriately formed members and heads are so correlated that the former may be inserted by endwise pressure to their places within the bearing seats, from the ends of the roller, and said seats will have a yieldable holding tendency upon said members.

In the accompanying drawing, wherein like characters of reference denote corresponding parts in the several views:

Fig. 1 is a view, partly in elevation and partly in section, of the shell which constitutes the body portion and heads of the roller;

Fig. 2 is a view, partly in section and partly in elevation, of one end of the shell before it has been subjected to pressure to form the corresponding integral head with its bearing seat;

Fig. 3 is an end view of the said shell;

Fig. 4 is a sectional view of one end of the roller and shows a ball bearing therein and also the corresponding end of a roller shaft and side member of a conveyer frame with which the roller may be associated in practice;

Fig. 5 is a detail representation of the inner member of the ball bearing unit shown in Fig. 4; and Fig. 6 is a detail representation of an adapter member which may be employed in lieu of the ball bearing unit, as the means for connecting the end of the roller with the roller shaft.

The roller body as shown in Fig. 1 comprises a shell $A^4$ each of whose ends is crimped by a suitable die to extend downward, as shown at $a^4$, thence inward, as shown at $a^5$, thence downward, as shown at $a^6$ and thence outward, as shown at $a^7$. The members $a^4$, $a^5$ and $a^6$ are relatively formed to give resilience which enables the member $a^7$, which is to provide a seat for an appropriately formed bearing member, as the outer member $B^2$ of a ball-bearing unit, for example, as shown in Fig. 4, to tightly embrace said member $B^2$ and frictionally hold the same in position. It will be noticed that said member $a^7$ extends outward from the member $a^6$ longitudinally of the axis of the roller and terminates at its free end within the vertical plane of the corresponding end of the roller.

This roller body is made from a tubular blank of suitable metal and of suitable length and diameter, whose ends as already stated are bent in appropriate dies to the described shape, thereby wholly eliminating the many operations which are incidental to the formation of roller bodies with separate ends to form bearing seats inserted in said bodies and secured in position.

The tube from which the body is formed has plane ends as shown at 10 in Figs. 2 and 3. The members which in practice are inserted in the seats and serve to connect the roller body with the shaft upon which the roller is mounted, may, as previously stated herein, be parts of a ball-bearing unit, or may be of non-ball-bearing nature, and in either case their outer surfaces are shaped to conform to the seats with which they are in close frictional contact substantially throughout their lengths.

Thus, it will be noticed that the outer member $B^2$ of each ball-bearing unit is formed to provide a surface which engages the corresponding seat $a^7$ of the roller body substantially throughout the length of said surface and seat. The member $B^2$ has its outer end formed with a lip or flange $b^2$, which engages the outer end of the corresponding seat $a^7$ and thereby defines the inward movement of said member within the roller body and aids in holding the same against accidental displacement.

The illustrated bearing unit has its inner surface at its rear end formed to provide the outer wall of a ball race, as shown at 15, and includes an inner member C which forms the body of said unit. It is formed externally, intermediate its ends, with a groove or depression which provides the inner wall 16 of the ball race. It has an axial opening 17 through which extends the stationary shaft X upon which the roller is journalled, the member C, when the parts are assembled in a conveyer, being fixed upon said shaft and the ends of the latter being mounted in an appropriate member Y of the conveyer frame. This member C of the ball-bearing unit extends through the outer member ($B^2$) of said unit and is held against longitudinal displacement inwardly by the balls D mounted in the race formed partly in the member C and partly in the complementary outer member. It is held against longitudinal displacement outwardly by a suitable means, as a snap ring 18 mounted in the groove 19 formed in the outer surface of the member C and bearing against the inner end of the outer member B².

It will be apparent that the several members making up the bearing unit may be readily assembled for application at any appropriate time to the corresponding roller body and that the assemblage of the body and bearing unit involves only the pressure of the unit into the end of the bearing member to its inward limit. It will also be apparent that in the operation of this roller as a member of a conveyer in which the roller has rotative movement about a stationary axis, the body of the roller and the outer member of the bearing unit will rotate as a unit about the inner member C of said bearing unit and upon the friction-reducing balls D.

In certain installations, however, it is preferred to dispense with ball-bearing units as a part of the rollers themselves and in such case the rollers are fixed to their respective shafts, which shafts usually are rotatably mounted in bearings of ball-bearing nature, mounted outside the rollers, as in frame members of the conveyer. Such an arrangement within the spirit of this invention may be brought about by substituting adapters for the several ball bearing units. A suitable adapter is shown in Fig. 6 and marked B¹². Through the medium of this adapter the roller body may be secured to an appropriate shaft for rotation with said shaft.

Having thus described the invention what we believe to be new and desire to secure by Letters Patent, is:—

1. A sheet metal conveyer roller shell having a body portion and heads formed of a single cylindrical member, the said heads being arranged at opposite ends of the body portion and each including an inner ring and an outer ring arranged substantially concentric with each other and with said body portion, said inner ring forming a bearing seat whose inner surface is arranged to have flatwise engagement with a bearing member insertible into said seat, and said outer ring being spaced from the body portion and from the inner ring and being connected with said body portion and inner ring respectively by reversely arranged curves.

2. A conveyer roller comprising a sheet metal body portion and heads formed of a single cylindrical member, and separately formed bearings mounted in the respective heads and having axial openings to receive a roller supporting shaft: each of said heads including an inner and an outer ring arranged substantially concentric with each other and with said body portion, said inner ring forming a bearing seat whose inner surface is arranged to have flatwise engagement with the corresponding bearing and said outer ring being spaced from the body portion and from the inner ring and being connected with said body portion and inner ring respectively by reversely arranged curves.

3. A conveyer roller according to claim 2, in which each bearing comprises an inner stationary member having an opening to receive the shaft upon which the roller is to be mounted, an outer member rotative with said body portion and heads and relative to said inner member and friction-reducing balls between said inner and outer members.

MERVIN L. WATSON.
JOHN C. WALTER.